(12) United States Patent
Coffin et al.

(10) Patent No.: US 6,707,770 B2
(45) Date of Patent: Mar. 16, 2004

(54) PICKER SHIPPING LOCK MECHANISM FOR DATA STORAGE SYSTEM

(75) Inventors: Paul C. Coffin, Fort Collins, CO (US); Robert L. Mueller, Windsor, CO (US); Gregg S. Schmidtke, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 397 days.

(21) Appl. No.: 09/729,934

(22) Filed: Dec. 5, 2000

(65) Prior Publication Data

US 2001/0000311 A1 Apr. 19, 2001

Related U.S. Application Data

(63) Continuation of application No. 09/188,401, filed on Nov. 6, 1998, now Pat. No. 6,226,252.

(51) Int. Cl.[7] ............................................. G11B 17/22
(52) U.S. Cl. ........................................................ 369/36
(58) Field of Search ................................ 360/256, 256.1, 360/256.2, 256.3, 256.4, 256.5, 256.6, 98.01, 98.02, 98.04; 206/404, 403, 405; 292/59; 220/632; 369/36.01

(56) References Cited

U.S. PATENT DOCUMENTS

| 1,867,206 | A | | 7/1932 | Brady |
| 3,297,153 | A | * | 1/1967 | Fattori .......................... 206/403 |
| 3,313,509 | A | | 4/1967 | Lockert |
| 4,052,093 | A | * | 10/1977 | Fattori ........................... 292/59 |
| 4,109,789 | A | * | 8/1978 | Fattori et al. ................ 206/404 |
| 4,212,445 | A | | 7/1980 | Hagen ........................... 248/245 |
| 4,940,140 | A | * | 7/1990 | Posso ........................... 206/405 |
| 5,004,393 | A | | 4/1991 | Lunka et al. ................. 414/331 |
| 5,014,255 | A | | 5/1991 | Wanger et al. ................. 369/36 |
| 5,027,949 | A | * | 7/1991 | Terwilliger et al. .......... 206/406 |
| 5,040,159 | A | | 8/1991 | Oliver et al. ................... 369/34 |
| 5,062,093 | A | | 10/1991 | Christie et al. ................. 369/36 |
| 5,163,833 | A | | 11/1992 | Olsen et al. ................... 439/61 |
| 5,174,516 | A | * | 12/1992 | Urlik et al. ............... 242/608.4 |
| 5,184,336 | A | | 2/1993 | Wanger et al. ................. 369/34 |
| 5,224,079 | A | | 6/1993 | Inoue ............................ 369/13 |
| 5,228,319 | A | | 7/1993 | Holley et al. ................... 70/58 |
| 5,231,615 | A | | 7/1993 | Endoh ........................... 369/32 |
| 5,442,500 | A | | 8/1995 | Hidano et al. ................. 360/22 |
| 5,537,271 | A | | 7/1996 | Kumai et al. ............. 360/99.06 |
| 5,596,556 | A | | 1/1997 | Luffel et al. ................... 369/36 |
| 5,644,559 | A | | 7/1997 | Christie, Jr. et al. ........... 369/36 |
| 5,659,434 | A | | 8/1997 | Yamakawa et al. ....... 360/99.06 |
| 5,680,375 | A | | 10/1997 | Christie, Jr. et al. ........... 369/30 |
| 5,682,096 | A | | 10/1997 | Christie, Jr. et al. ......... 324/207 |
| 5,690,306 | A | | 11/1997 | Roesner ................... 248/222.52 |
| 5,717,665 | A | | 2/1998 | Jones ............................ 369/36 |
| 5,793,714 | A | * | 8/1998 | Inoue et al. ................... 369/30 |
| 5,982,734 | A | * | 11/1999 | Yamashita et al. ........... 369/178 |
| 6,025,972 | A | | 2/2000 | Schmidtke et al. ....... 360/98.06 |
| 6,198,596 | B1 | * | 3/2001 | Kumagai et al. ........... 360/96.5 |
| 6,215,614 | B1 | * | 4/2001 | Todd et al. ................. 360/96.5 |

FOREIGN PATENT DOCUMENTS

| EP | 0 662 686 A | 12/1995 |
| JP | 63 166 069 | 9/1988 |

* cited by examiner

Primary Examiner—Tianjie Chen

(57) ABSTRACT

Shipping lock apparatus for securing a moveable cartridge picker assembly to a frame may comprise a lock member mounted to the cartridge picker assembly so that the lock member can be moved between a locked position and an unlocked position. A thumb assembly contained within the cartridge picker contacts the lock member as the thumb assembly moves to a retracted position so that the lock member is moved to the unlocked position when the thumb assembly reaches the retracted position. A slot associated with the frame engages the lock member when the cartridge picker assembly is located at a stowed position and when the lock member is placed in the locked position.

6 Claims, 10 Drawing Sheets

PICKER SHIPPING LOCK MECHANISM FOR DATA STORAGE SYSTEM

CROSS REFERENCE TO RELATED APPLICATION(S)

This application is a continuation of copending U.S. application Ser. No. 09/188,401, filed Nov. 6, 1998, now U.S. Pat. No. 6,226,252.

FIELD OF INVENTION

This invention relates generally to data storage systems for handling and storing data cartridges, such as optical disk or magnetic tape cartridges, and more specifically to restraining apparatus for protecting the moveable internal mechanisms of such data storage systems against damage due to shipping or transport.

BACKGROUND

Many different types of data storage systems exist and are being used to store data cartridges at known locations and to retrieve desired data cartridges so that data may be written to or read from the data cartridges. Such data storage systems are often referred to as "juke box" data storage systems, particulary if they can accommodate a large number of individual data cartridges.

A typical juke box data storage system may include one or more different types of cartridge receiving devices for holding the various data cartridges. For example, one type of cartridge receiving device may comprise a cartridge storage rack or "magazine" while another type of cartridge receiving device may comprise a cartridge read/write device. The cartridge storage racks or magazines serve to provide storage locations for the data cartridges and are often arranged so that they form one or more vertical stacks, although other configurations are possible. The cartridge read/write device may be located at any convenient location within the data storage system.

The data storage system may also be provided with a moveable cartridge engaging assembly or "picker" for transporting the data cartridges between the various cartridge receiving devices, e.g., between the cartridge storage racks and the cartridge read/write devices. A typical cartridge engaging assembly or picker may also be provided with a cartridge plunge mechanism or "thumb" assembly for engaging the various data cartridges contained in the cartridge receiving devices and for drawing them into the picker. A picker positioning system associated with the cartridge picker assembly may be used to move the cartridge picker assembly along the various cartridge receiving devices.

Data storage systems of the type described above are usually connected to a host computer system which may be used to access or store data on the data cartridges. For example, if the host computer system issues a request for data contained on a particular data cartridge, a control system associated with the data storage system will actuate the picker positioning system to move the picker assembly along the cartridge storage racks until the picker assembly is positioned adjacent the desired data cartridge. The cartridge plunge mechanism or "thumb" assembly associated with the picker assembly may then remove the data cartridge from the cartridge storage rack and draw it into the picker assembly. The picker positioning system may then be actuated to move the picker assembly to the appropriate cartridge read/write device. Once properly positioned adjacent the cartridge read/write device, the thumb assembly may insert the selected data cartridge into the cartridge read/write device so that the host computer may thereafter read data from or write data to the data cartridge. After the read/write operation is complete, the thumb assembly may be actuated to remove the data cartridge from the cartridge read/write device. The picker assembly may thereafter return the data cartridge to the appropriate location in the cartridge storage rack.

One problem associated with data storage systems of the type described above relates to excessive movement of the moveable components (e.g., the picker assembly) during transport or shipping of the data storage system. Excessive movement of these components during shipping or transport can upset the precise alignment of the system, possibly requiring that the system be re-aligned or re-calibrated before it can be placed in service. In extreme cases, excessive movement of such moveable components can physically damage the moveable components, requiring that they be repaired or replaced before the data storage system can be placed in service.

In an effort to avoid the foregoing problems, various types of restraining devices have been developed to prevent the excessive movement of the moveable components during shipping or transport of the data storage system. Chief among such restraining devices are screw and/or combination screw-bracket assemblies. Typically, such devices are used to secure the moveable components (e.g., the cartridge picker) to the frame or chassis of the data storage system, thereby substantially reducing the likelihood that the moveable components will be damaged during subsequent shipping or transport. While such restraining devices are generally effective from a functional standpoint, they typically require the user to remove the individual screws and/or screw-bracket assemblies before the device may be placed in service. Besides being time-consuming to accomplish and usually requiring the use of separate tools, some users may damage the moveable components in the process if they are careless or do not have the required skills. Still other users may fail to remove the shipping restraints altogether, often leading them to erroneously conclude that the system is malfunctioning.

Consequently, a need remains for a shipping restraint system for securing moveable assemblies contained within data storage devices or similar systems to reduce the chances that the moveable internal components will become misaligned or damaged during transport. Ideally, such a shipping restraint should be inexpensive to manufacture, yet be easily disengaged by the user, preferably without requiring separate tools. Still other advantages could be realized if such a shipping restraint system could be easily re-engaged to allow a user to move the device to another location.

SUMMARY OF THE INVENTION

Shipping lock apparatus for securing a moveable cartridge picker assembly to a frame may comprise a lock member mounted to the cartridge picker assembly so that the lock member can be moved between a locked position and an unlocked position. The thumb assembly contained within the cartridge picker contacts the lock member as the thumb assembly moves to a retracted position so that the lock member is moved to the unlocked position when the thumb assembly reaches the retracted position. A slot associated with the frame engages the lock member when the cartridge picker assembly is located at a stowed position and when the lock member is placed in the locked position.

Also disclosed is a method for securing the moveable carriage to the frame that comprises the steps of moving the moveable carriage to a stowed position adjacent the frame and moving the lock member to the locked position to engage the lock member with the slot in the frame.

BRIEF DESCRIPTION OF THE DRAWING

Illustrative and presently preferred embodiments of the invention are shown in the accompanying drawing in which.

DETAILED DESCRIPTION OF THE INVENTION

A shipping lock 10 according to one preferred embodiment of the invention is shown and described herein as it may be used to releasably secure a moveable carriage, such as a cartridge engaging assembly or "picker" 12 associated with a "juke box" data storage system 14. The shipping lock 10 may be engaged before the data storage system 14 is moved or transported to prevent excessive movement of the carriage, (e.g., cartridge picker assembly 12). The shipping lock 10 thereby substantially reduces the likelihood that the cartridge picker assembly 12 will become mis-aligned or damaged during transport.

Figure 1:
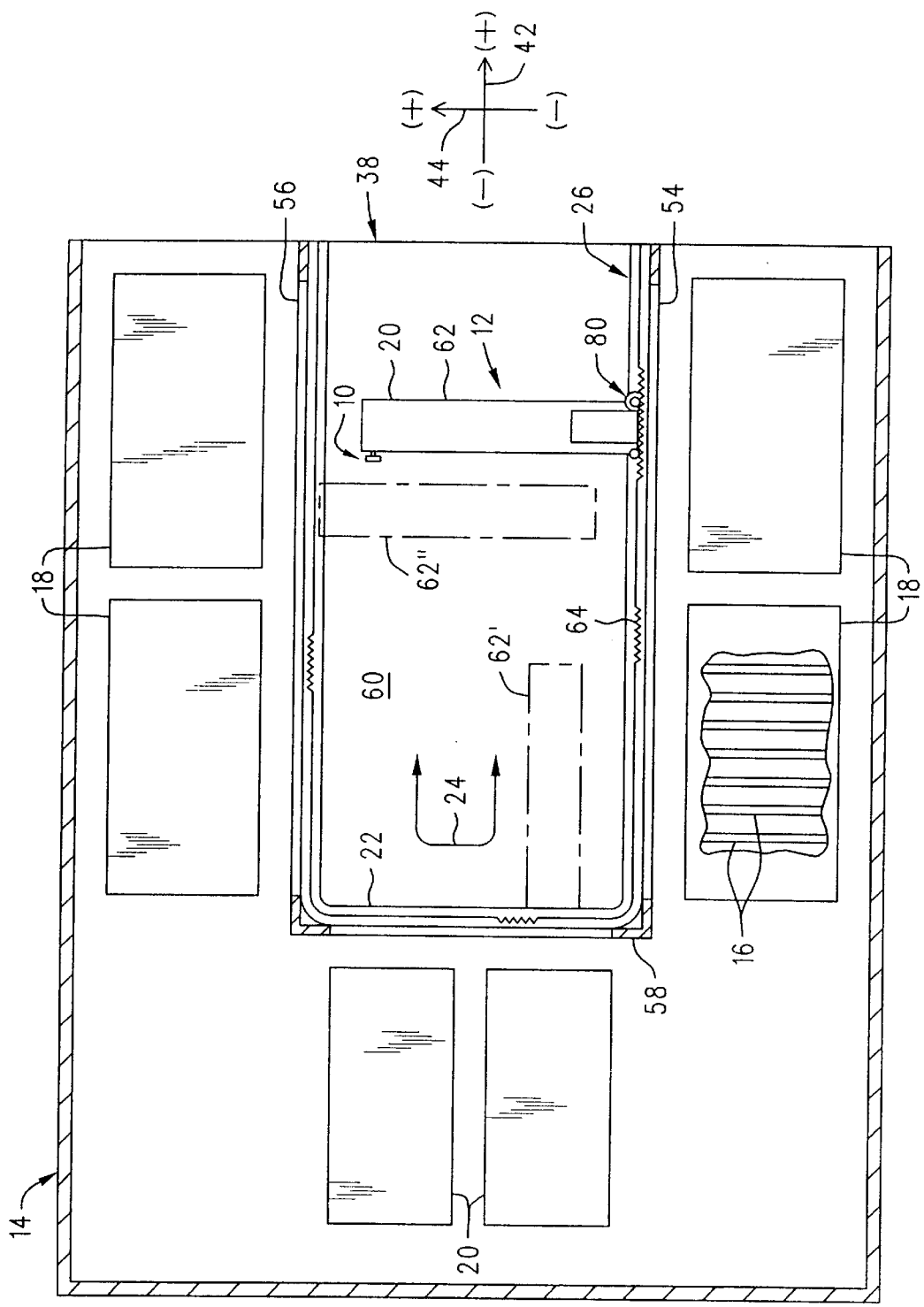
FIG. 1 is a plan view of a data storage system utilizing the shipping lock apparatus according to the present invention.

The juke box data storage system 14 in which the shipping lock 10 may be used is best seen in FIG. 1 and may comprise a generally rectangularly shaped frame or chassis assembly 38 around which are arranged a plurality of cartridge receiving devices, such as one or more cartridge storage racks or magazines 18 and one or more cartridge read/write devices 20. In the embodiment shown and described herein, the various cartridge receiving devices (e.g., the cartridge storage racks or magazines 18 and the cartridge read/write devices 20) are positioned so that they define a generally U-shaped configuration. Alternatively, other configurations are possible, as will be described in greater detail below.

The cartridge picker assembly 12 may be mounted to a U-shaped guide track 22 provided on the frame or chassis assembly 38. The U-shaped guide track 22 guides the cartridge picker assembly 12 along a generally U-shaped path 24, thereby allowing the cartridge picker 12 to access all of the cartridges 16 stored in the various cartridge receiving devices (e.g., 18, 20). A picker positioning system 26 operatively associated with the cartridge picker assembly 12 may be used to move the cartridge picker assembly 12 to various positions along the U-shaped guide track 22.

Figure 5:
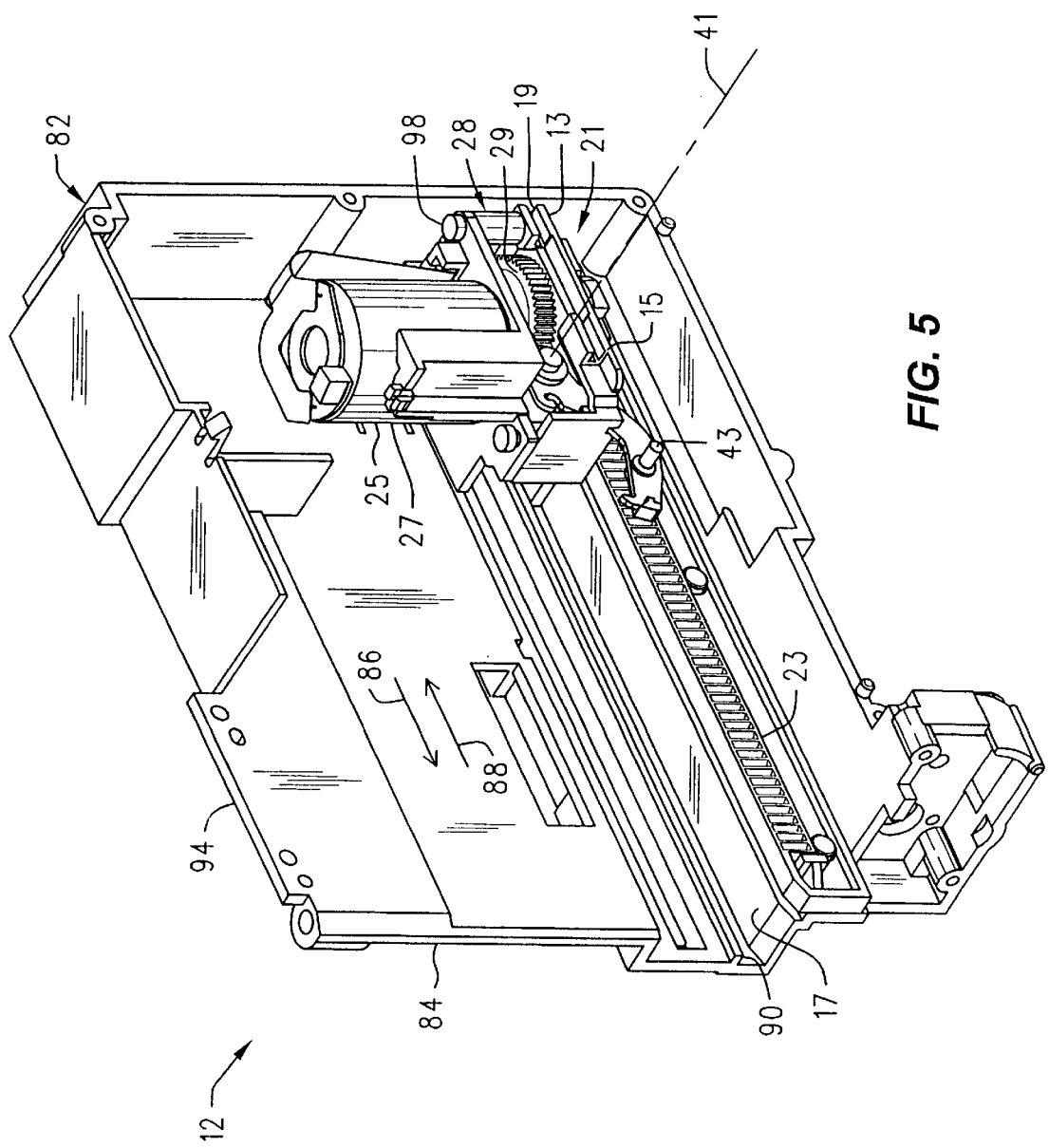
FIG. 5 is a perspective view of the left side of the cartridge engaging assembly showing the cartridge plunge mechanism.
Figure 10A:
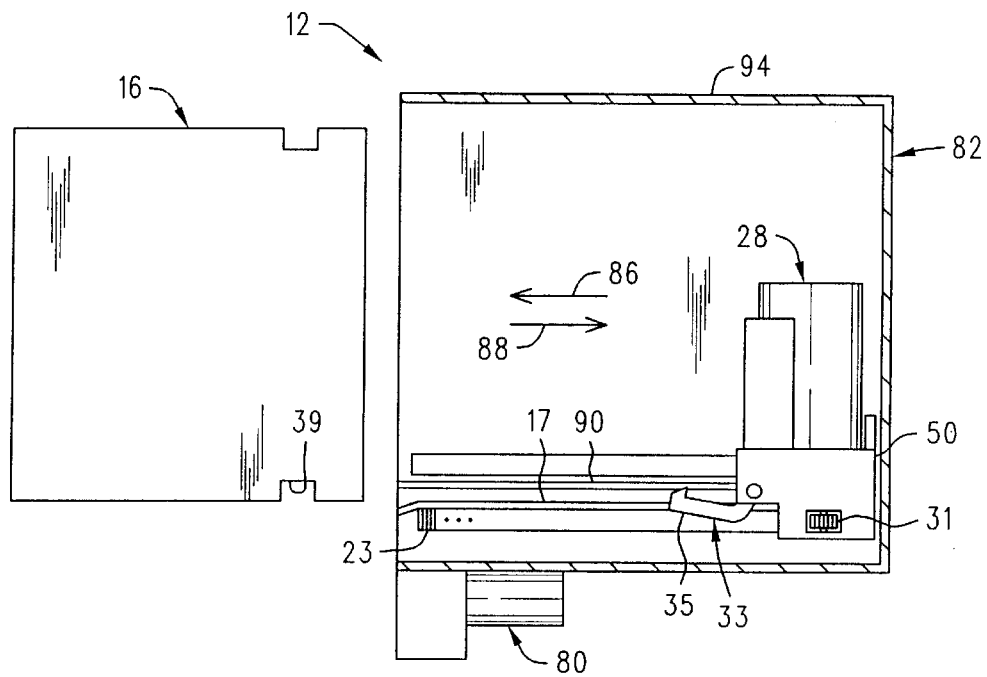
FIGS. 10a and 10b are side views of the cartridge engaging assembly showing the cartridge plunge mechanism in the retracted and extended positions, respectively.
Figure 10B:
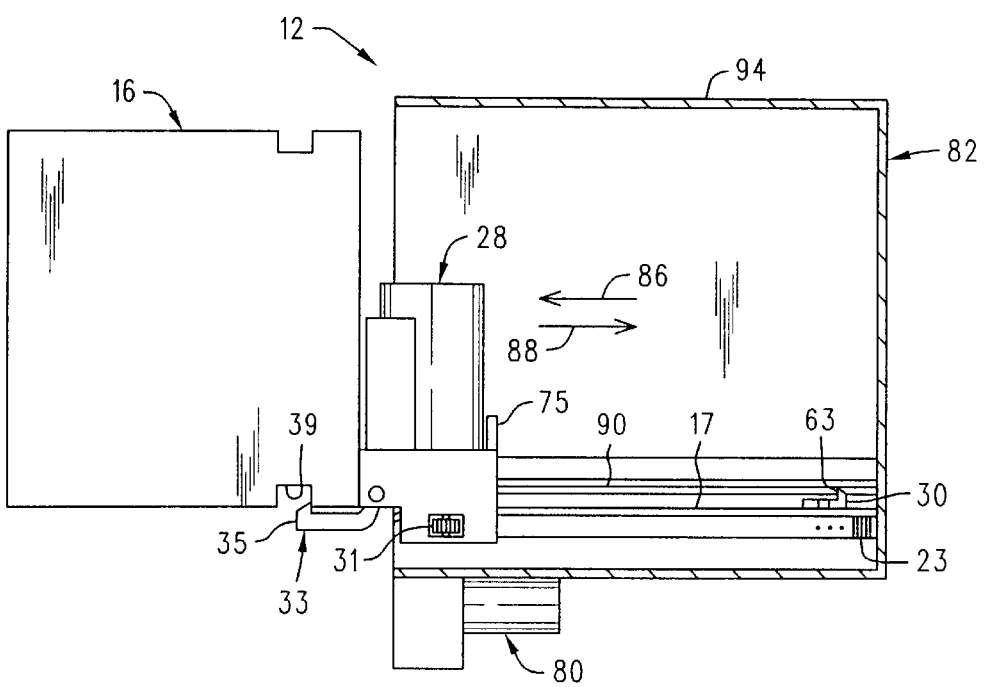

Referring now primarily to FIGS. 5, 10a, and 10b, the cartridge picker assembly 12 may be provided with a cartridge plunge mechanism or "thumb" assembly 28 for removing and replacing the data cartridges 16 contained within the various cartridge receiving devices. In one preferred embodiment, the thumb assembly 28 is moveably mounted within the cartridge picker assembly 12 so that the thumb assembly 28 may be moved between a retracted position 50 (shown in FIG. 10a) and an extended position 75 (shown in FIG. 10b). That is, the thumb assembly 28 may be extended and retracted within the cartridge picker assembly 12 in the directions indicated by arrows 86 and 88, respectively. The thumb assembly 28 may be provided with a finger assembly 33 to allow the thumb assembly 28 to engage and disengage a data cartridge 16, as will be described in greater detail below.

To summarize, the thumb assembly 28 may be used to engage a selected data cartridge 16, remove it from the cartridge receiving device (e.g., a cartridge magazine 18 or a cartridge read/write device 20, as the case may be), and draw it into the picker assembly 12. The thumb mechanism 28 may also be used to insert a data cartridge 16 into the desired cartridge receiving device. The cartridge picker assembly 12 may be used to carry the data cartridges 16 to the appropriate locations within the data storage system 14.

Figure 2:
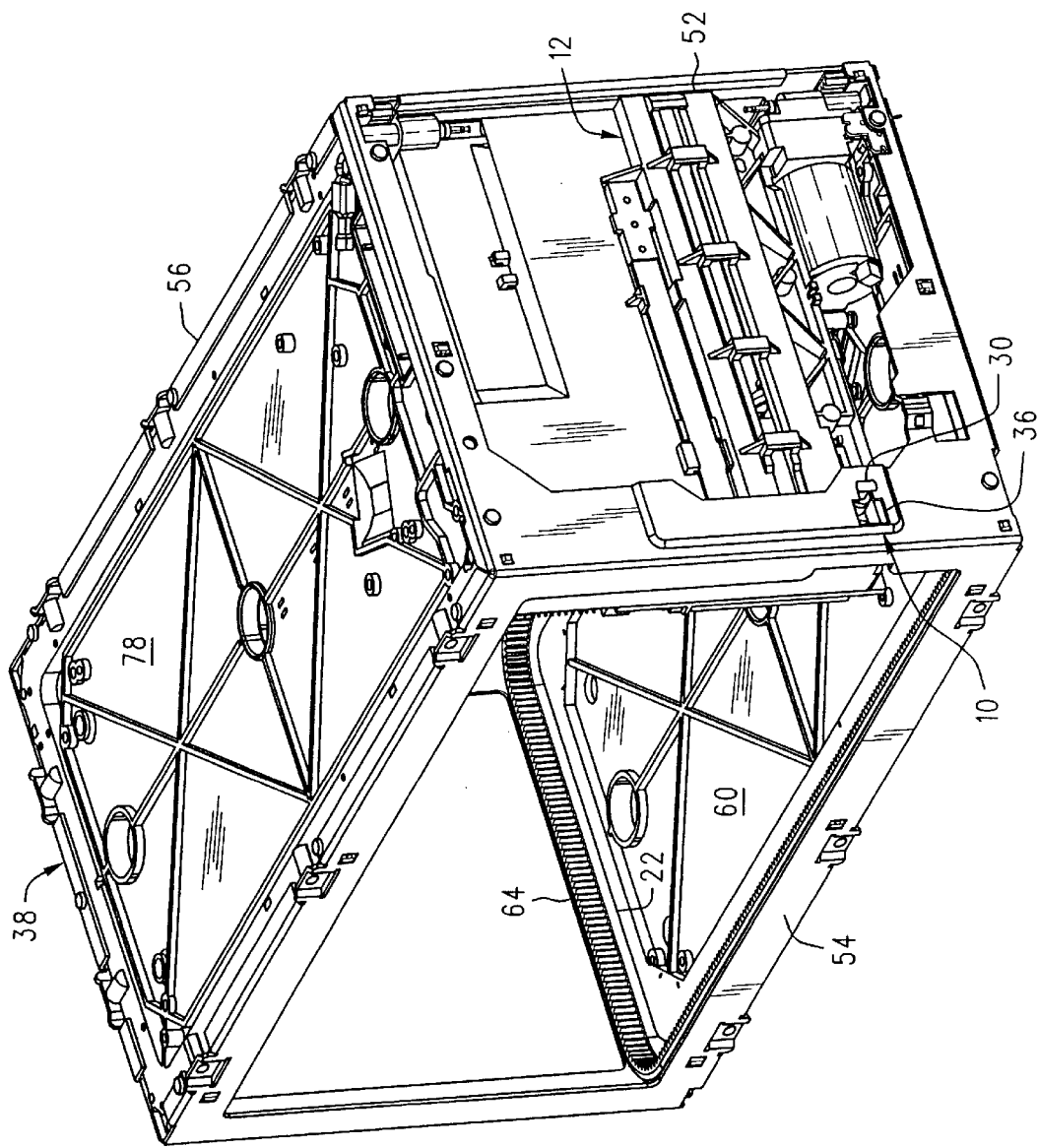
FIG. 2 is a perspective view of the frame structure and cartridge engaging assembly showing the cartridge engaging assembly in the stowed position.
Figure 3:
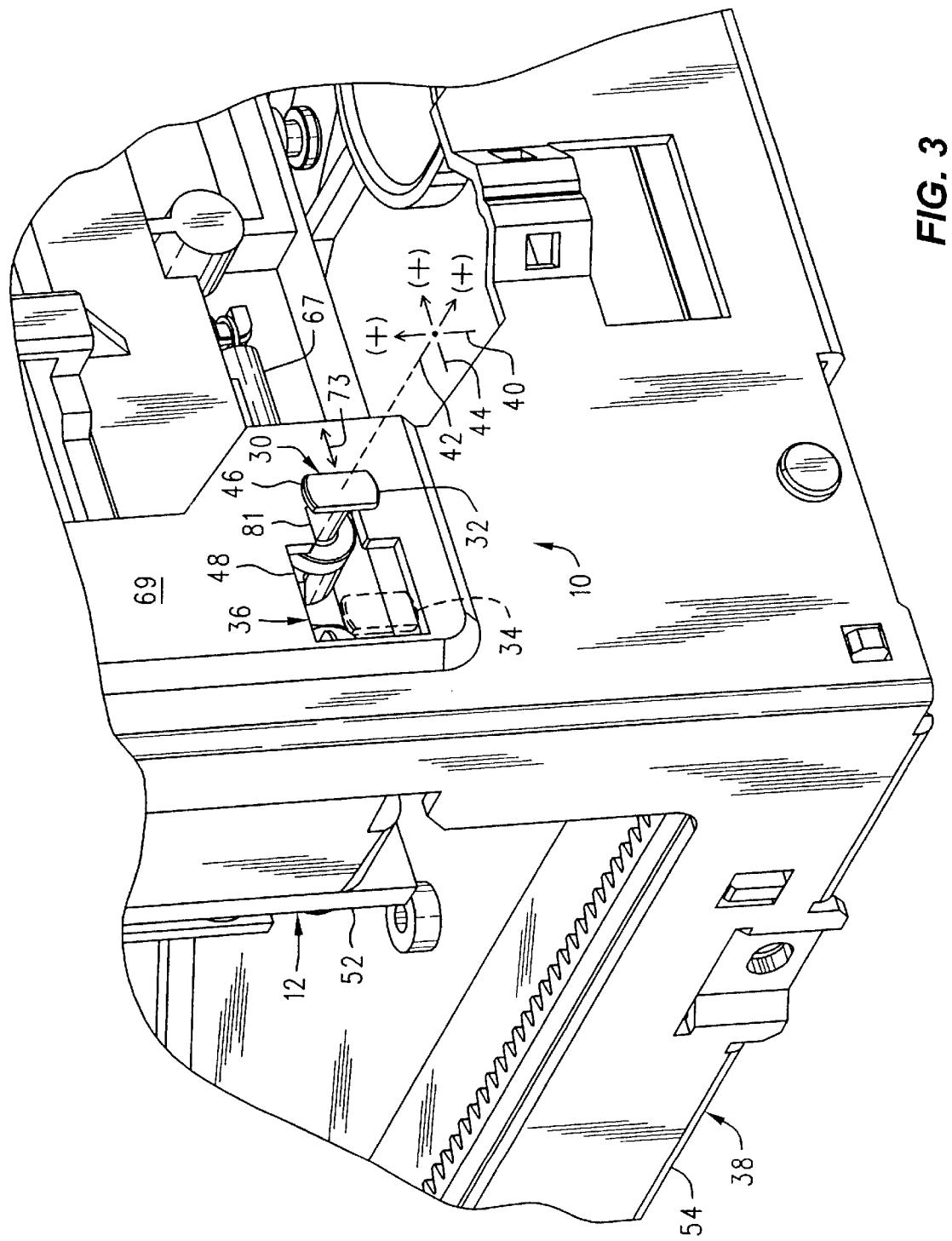
FIG. 3 is an enlarged perspective view of the frame structure shown in FIG. 2 showing the engagement of the lock member with the slot in the chassis.

The shipping lock apparatus 10 is best seen in FIGS. 2 and 3 and may comprise a lock member 30 that is attached to the cartridge picker assembly 12 so that the lock member 30 may be moved back and forth (i.e., generally in the directions indicated by arrows 73) between a locked position 32 and an unlocked position 34. A bias member or spring 67 connected between the lock member 30 and the picker frame 82 may be used to bias the lock member 30 in the locked position 32. As will be described in greater detail below, the thumb assembly 28 contained within the cartridge picker assembly 12 may be used to move the lock member 30 from the locked position 32 to the unlocked position 34. Put in other words, the thumb assembly 28 is a lock actuator which moves the lock member 30 between the locked and unlocked positions 32 and 34, respectively.

A T-shaped slot 36 located in the chassis or frame 38 of the data storage system 14 is sized to receive and engage the lock member 30 in the manner best seen in FIG. 3. That is, when the lock member 30 is in the unlocked position 34, the enlarged head 46 of the lock member 30 is free to pass through the enlarged portion 48 of the T-shaped slot 36. Thereafter, if the lock member 30 is moved to the locked position 32, the lock member 30 will engage leg portion 81 of the T-shaped slot 36. This engaged condition is illustrated in FIGS. 2 and 3. The engagement of the lock member 30 with the slot 36 in the frame or chassis 38 restrains the cartridge picker assembly 12 in the vertical and lateral directions 40 and 42, respectively. The engagement of the lock member 30 and slot 36 also prevents the cartridge picker 12 from moving in the positive (+) longitudinal direction 44.

The shipping lock apparatus 10 may be operated as follows to secure the moveable cartridge picker 12 to the frame or chassis 38 of the data storage system 14. As a first step in the process, the thumb assembly 28 mounted within the cartridge picker assembly 12 is moved in the direction of arrow 88 to the fully retracted position 50, as best seen in FIG. 10a. As the thumb assembly 28 nears the fully retracted position 50, it contacts the lock member 30 and moves it toward the unlocked position 34. When the thumb assembly 28 reaches the fully retracted position 50 (as shown in FIG. 10a), the lock member 30 will be in the fully unlocked position 34, as best seen in FIG. 3. The picker positioning system 26 (FIG. 1) may then be operated as necessary to move the picker 12 in the positive (+) lateral direction 42 until it reaches the stowed position 52 illustrated in FIGS. 2 and 3. As the picker positioning system 26 moves the picker 12 toward the stowed position 52, the enlarged head 46 of the lock member 30 passes through the enlarged portion 48 of the T-shaped slot 36. The picker positioning system 26 may continue to move the cartridge picker 12 toward the stowed position 52 (i.e., in the positive (+) lateral direction 42) until the cartridge picker 12 abuts against a "hard stop" (not shown) provided on the frame or chassis 38. When the cartridge picker assembly 12 is fully in the stowed position 52, the enlarged head 46 of the lock member 30 will be fully through the enlarged portion 48 of the T-shaped slot 36. The thumb assembly 28 contained within the cartridge picker 12 may then be extended slightly (i.e., moved in the direction of arrow 86, FIG. 5) which allows the bias member or spring 67 to return the lock member 30 to the locked position 32, thereby causing the lock member 30 to engage the T-shaped slot 36. The engagement of the lock member 30 with the T-shaped slot 36 secures the cartridge picker 12 to the frame or chassis 38, thus preventing excessive movement of the cartridge picker 12 with respect to the chassis 38. The data storage system 14 may thereafter be moved or transported without the danger that the moveable cartridge picker assembly 12 will be damaged or mis-aligned due to excessive movement of the cartridge picker assembly 12 within the chassis 38.

The shipping lock apparatus 10 may be disengaged or unlocked after the data storage system 14 has been moved to its new location by essentially reversing the engagement process described above. That is, the shipping lock 10 may be disengaged by first moving the thumb mechanism 28 contained within the cartridge picker 12 to the fully retracted position 50 (FIG. 10a). Full retraction of the thumb assembly 28 moves the lock member 30 from the locked position 32 to the unlocked position 34 (FIG. 3). The picker positioning system 26 may thereafter be actuated to move the cartridge picker 12 in the negative (−) lateral direction 42 i.e., away from the stowed position 52, which withdraws the enlarged head 46 of lock member 30 from the enlarged portion 48 of T-shaped slot 36. The data storage system 14 thereafter may be placed in service and operated as desired.

A significant advantage of the shipping lock apparatus 10 according to the present invention is that it positively secures the moveable cartridge picker assembly 12 to the frame 38 without requiring separate fasteners and/or bracket assemblies. Consequently, the shipping lock apparatus dispenses with the need to manually fasten and remove separate fasteners or devices in order to secure and free the moveable cartridge picker assembly 12 to the frame 38. Still other advantages are associated with the automatic disengagement and engagement functions provided by the shipping lock according to the present invention. For example, the automatic lock disengagement function completely eliminates the need for the user to perform any manual disengagement of the lock. The ability to automatically re-engage the shipping lock increases user convenience in the event the data storage system ever needs to be moved or re-located.

That is, the user may re-secure the moveable cartridge picker assembly 12 to the frame 38 by simply instructing the control system to re-engage the shipping lock. Thereafter, the user may move or transport the data storage device confident that the cartridge picker assembly 12 will not become mis-aligned or damaged due to excessive movement within the data storage system.

Having briefly described the shipping lock apparatus 10, as well as some of its more significant features and advantages, the various embodiments of the shipping lock apparatus according to the present invention will now be described in detail. However, before proceeding with the description, it should be noted that the shipping lock apparatus 10 according to the present invention may be utilized in any of a wide range of devices having moveable internal components that are now known in the art or that may be developed in the future. Accordingly, the present invention should not be regarded as limited to the particular data storage system 14 and cartridge picker assembly 12 shown and described herein.

With the foregoing considerations in mind, one embodiment of a shipping lock apparatus 10 is shown and described herein as it may be used in a "juke box" data storage system 14. In one preferred embodiment, the juke box data storage system 14 may comprise a data storage system of the type shown and described in U.S. patent application Ser. No. 09/045,134, filed Mar. 20, 1998, now U.S. Pat. No. 6,025,972, entitled "Multi-Plane Translating Cartridge Handling System," which is incorporated herein by reference for all that it discloses. Alternatively, the data storage system 14 may be of the type shown and described in U.S. Pat. No. 5,596,556, entitled "Linear Displacement and Support Apparatus for use in a Cartridge Handling System," which is also incorporated herein by reference for all that it discloses.

Referring now primarily to FIGS. 1 and 2, the data storage system 14 shown and described in U.S. Pat. No. 6,025/972 referred to above may comprise a generally rectangularly shaped frame or chassis assembly 38 having a pair of opposed side portions 54 and 56 and an end portion 58 around which are positioned various cartridge receiving devices. More specifically, a pair of cartridge storage racks or magazines 18 may be positioned adjacent each opposed side portion 54 and 56 of the frame or chassis assembly 38, whereas a pair of cartridge read/write devices 20 may be positioned adjacent the end portion 58 of the frame assembly 38. Accordingly, the various cartridge receiving devices (e.g., the cartridge storage racks or magazines 18 and the cartridge read/write devices 20) define a generally U-shaped configuration.

Figure 4:
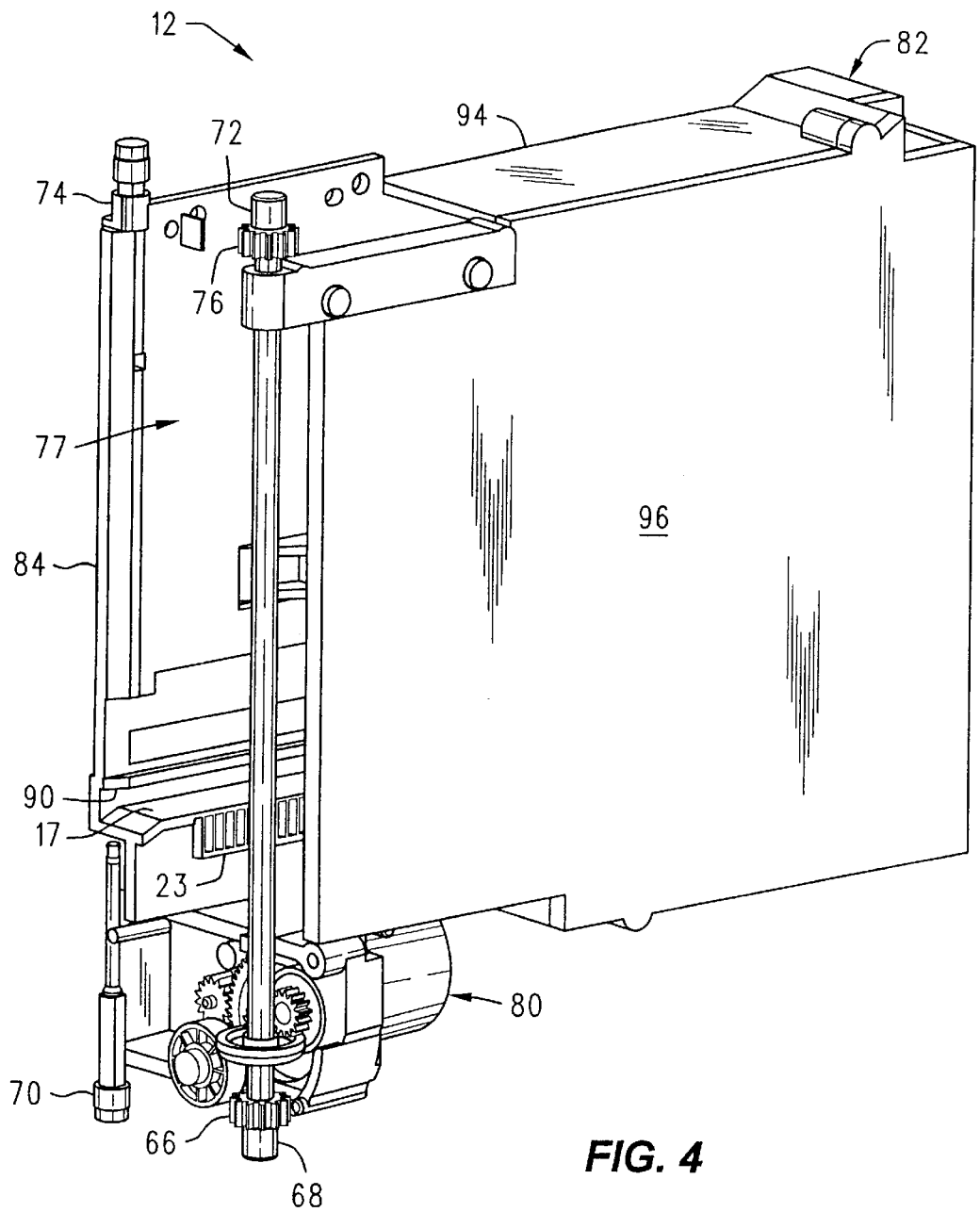
FIG. 4 is a perspective view of the cartridge engaging assembly.

The frame or chassis assembly 38 may be provided with a lower plate 60 and an upper plate 78 arranged so that they are positioned in parallel, spaced-apart relation. See FIG. 2. The lower plate 60 may be provided with a U-shaped guide track or channel 22 therein, as best seen in FIG. 1. Similarly, the upper plate 78 may also be provided with a U-shaped guide track or channel (not shown) therein. The cartridge engaging assembly or picker assembly 12 may be configured to travel along the guide tracks (e.g., guide track 22) provided in the lower and upper plates 60 and 78 of frame assembly 38. Referring now to FIG. 4, the cartridge picker assembly 12 may be provided with a pair of lower bearing members 68 and 70 sized to be received by the lower guide track or channel 22 in the lower plate 60. The cartridge picker assembly 12 may also be provided with a pair of upper bearing members 72 and 74 that are sized to be received by the upper guide track or channel (not shown)

provided in the upper plate 78. The arrangement is such that the U-shaped guide tracks (e.g., guide track 22) provided in the lower and upper plates 60 and 78 guide the cartridge picker assembly 12 along the generally U-shaped path 24 so that the cartridge picker assembly 12 may access the data cartridges 16 contained in the various cartridge magazines 18 and the cartridge read/write devices 20.

A picker positioning system 26 (FIG. 1) may be used to move the cartridge picker assembly 12 along the U-shaped guide track 22. For example, in the embodiment shown and described herein, the picker positioning system 26 may move the cartridge picker 12 between a first position 62 adjacent the first side portion 54 of the frame assembly 38, a second position 62' adjacent the end portion 58 of frame assembly 38, and a third position 62" adjacent the second side portion 56 of frame assembly 38.

The picker positioning system 26 may comprise a rack and pinion drive system having a U-shaped gear rack 64 mounted to the lower plate 60 of frame assembly 38 at a position adjacent the U-shaped guide track 22. See FIGS. 1 and 2. The upper plate 78 of frame assembly 38 may also be provided with a similar U-shaped gear rack (not shown) located at a position adjacent the U-shaped guide track (not shown) provided in the upper plate 78. The cartridge picker assembly 12 may be provided with a lower pinion gear 66 (FIG. 4) sized and positioned so that it will engage the lower U-shaped gear rack 64 provided on the lower plate 60. The cartridge picker assembly 12 may also be provided with an upper pinion gear 76 sized and positioned so that it will engage the upper U-shaped gear rack (not shown) provided on the upper plate 78. A drive pinion actuator system 80 mounted to the cartridge picker assembly 12 may be used to drive the lower and upper pinion gears 66 and 76, thereby move the picker assembly 12 along the U-shaped path 24.

Figure 6:
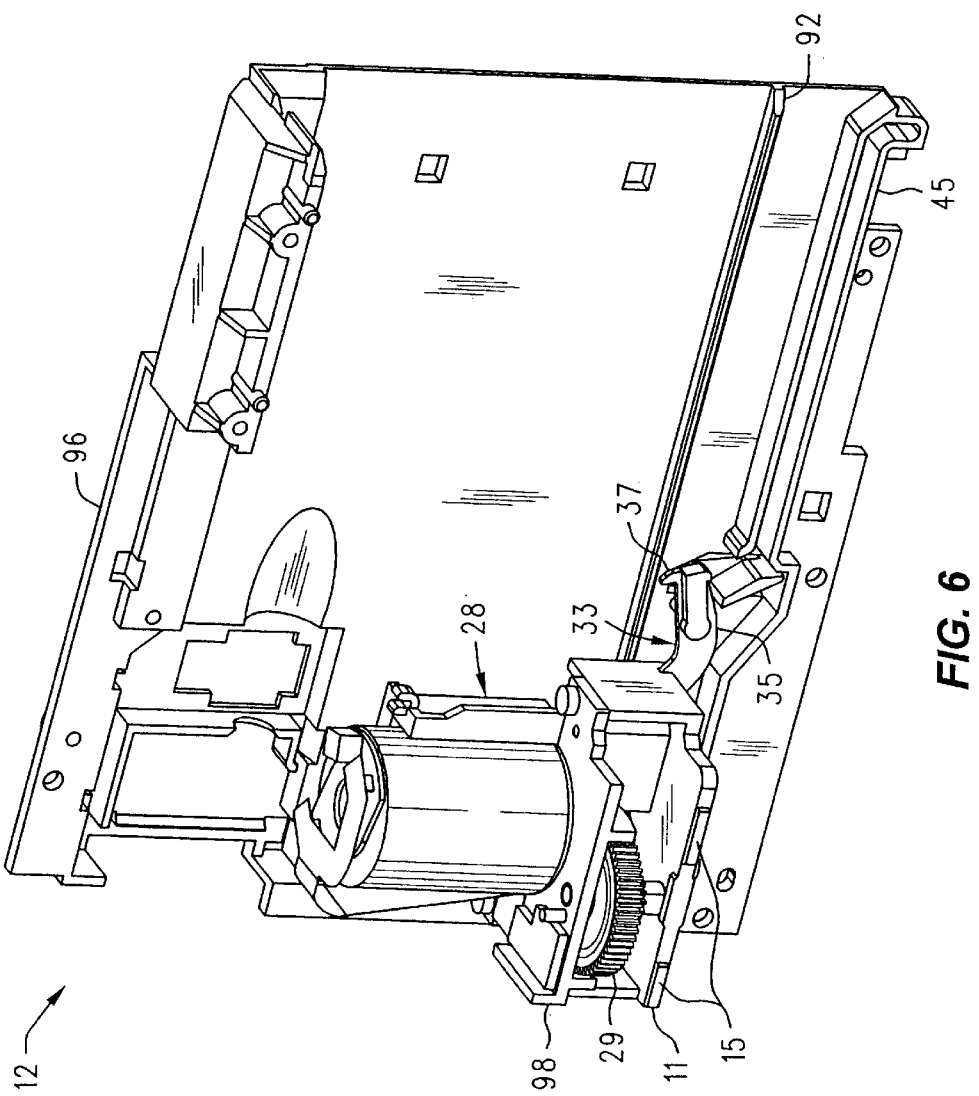
FIG. 6 is a perspective view of the right side of the cartridge engaging assembly showing the cartridge plunge mechanism.

The details of the cartridge picker assembly 12 that may be utilized in one preferred embodiment of the present invention are best seen in FIGS. 4–6. Essentially, the cartridge picker assembly 12 may include a picker frame assembly 82 having a first side member 94 and a second side member 96. The two side members 94 and 96 define an interior chamber or cavity 77 of sufficient size to receive a data cartridge 16. The thumb assembly 28 is slidably mounted to the frame assembly 82 so that the thumb assembly 28 may be moved toward and away from the cartridge access end 84 of frame assembly 82, i.e., generally in the directions of arrows 86 and 88, respectively. See FIG. 5. More specifically, the thumb assembly 28 is slidably mounted to the frame assembly 82 so that the thumb assembly 28 may be moved between a retracted position 50 (illustrated in FIG. 10a) and an extended position 75 (illustrated in FIG. 10b).

The thumb assembly 28 may be slidably mounted to the frame assembly 82 of picker 12 by any of a wide range of mounting systems and devices well-known in the art that would allow the thumb assembly 28 to be moved between the retracted and extended positions 50 and 75 in the manner just described. Consequently, the present invention should not be regarded as limited to the particular mounting arrangement shown and described herein. However, by way of example, the thumb assembly 28 utilized in one preferred embodiment may be mounted to the frame assembly 82 of cartridge picker 12 by the mounting system shown and described in U.S. patent application Ser. No. 09/045,380, filed Mar. 20, 1998, now U.S. Pat. No. 6,104,693, entitled "Mounting System for Cartridge Plunge Mechanism," which is incorporated herein by reference for all that it discloses.

Briefly, the thumb assembly 28 described in U.S. Pat. No. 6,104,693 referenced above may be mounted on first and second elongate guide rails 90 and 92 that are provided on the first and second sides 94 and 96 of the picker frame assembly 82. More specifically, the thumb assembly 28 may include a main body portion 98 from which extends a first flange member 11 (FIG. 6) and a second flange member 13 (FIG. 5). The first flange member 11 may be provided with a plurality of bearing shoes 15 mounted thereon for engaging the first guide rail 90 and a horizontal guide surface 17 contained on the first side 94 of picker frame assembly 82. The second flange member 13 is best seen in FIG. 5 and may be provided with an elongate slot 19 therein so that the second flange member 13 engages the upper and lower surfaces of the second guide rail 92 on the second side 96 of picker frame assembly 82. See FIG. 6. The elongate slot 19 and outside faces of the second flange member 13 may also be provided with bearing shoes 15' to provide a low friction engagement with the second guide rail 92.

The various components just described may be made from any of a wide range of materials, such as metals or plastics, suitable for the intended application. For example, in one preferred embodiment, the first and second side members 94 and 96 comprising the picker frame assembly 82 are molded from a polycarbonate plastic material. Accordingly, the various components and features contained therein, e.g., the guide rail 90, horizontal guide surface 17, along with the second guide rail 92, may be provided as integral components of the respective side members 94 and 96. Alternatively, the first and second side members 94 and 96 comprising the picker frame assembly 82 may be made from other materials, in which case the various components and features of the side members 94 and 96 may comprise integral components or separate elements, depending on the particular design and material to be utilized.

The main body portion 98 of thumb assembly 28 may also be made from any of a wide range of materials suitable for the intended application. For example, in the embodiment shown and described herein, the main body portion 98 of thumb assembly 28 is made from nylon with a small amount of Teflon® added (e.g., about 15% by weight) as a friction modifier, although other materials could also be used. In one preferred embodiment, the various bearing shoes 15 provided on the first and second flange members 11 and 13 of main body portion 98 of thumb assembly 28 comprise integral portions of the main body portion 98. Alternatively, the bearing shoes 15 could comprise separate elements that may then be affixed to the first and second flange members 11 and 13. If so, the various bearing shoes 15 may be fabricated from any of a wide range of materials (e.g., Teflon®) suitable for providing a low friction engagement with the first and second guide rails 90 and 92.

The thumb assembly 28 may be moved between the retracted and extended positions 50 and 75 (FIGS. 10a and 10b), respectively, by any of a wide range of actuator systems. By way of example, in one preferred embodiment, the thumb assembly 28 may be moved between the retracted and extended positions 50 and 75, respectively, by a rack and pinion drive assembly of the type shown and described in U.S. patent application Ser. No. 09/045,558, filed Mar. 20,1998, now U.S. patent No. 6,160,786, entitled "Cartridge Engaging Assembly with Rack Drive Thumb Actuator System," which is incorporated herein by reference for all that it discloses. Alternatively, other types of thumb actuator systems may be used.

The rack and pinion drive system 21 utilized in one preferred embodiment of the present invention and shown and described in U.S. Pat. No. 6,160,786, referred to above, is best seen in FIG. 5 and may comprise an elongate gear rack 23 that is affixed to the first side member 94 of the picker frame assembly 82. The gear rack 23 may be located at any convenient position on the first side member 94. For example, in one preferred embodiment, the gear rack 23 is located at a position immediately below the horizontal guide surface 17. Alternatively, the gear rack 23 may be located elsewhere on the first side member 94 or could even be located on the second side member 96.

The gear rack 23 may be made from any of a wide range of materials, such as metals or plastics, suitable for the intended application. For example, in the embodiment shown and described herein wherein the first side member 94 comprises molded plastic, the gear rack 23 comprises an integral feature of the first side member 94. Alternatively, the gear rack 23 may comprise a separate component fixedly mounted to the first side member 94.

The main body portion 98 of thumb assembly 28 may be provided with a pinion gear 31 positioned so that it engages the gear rack 23. See FIGS. 10a and 10b. The pinion gear 31 is caused to rotate by a drive system 25 which, in one preferred embodiment, includes a motor 27 and a gear reduction system 29. The motor 27 may be mounted to the main body portion 98 of thumb assembly 28 and is operatively associated with the gear reduction system 29 so that the motor 27 rotates the pinion gear 31 to extend and retract the thumb assembly 28.

The motor 27 may comprise any of a wide range of motors suitable for the intended application. In one preferred embodiment, the motor 27 comprises a permanent magnet d.c. motor, such as model no. RS-385PH, available from Mobuchi Co. of China, although other types may also be used.

The gear reduction system 29 may comprise a conventional gear reduction system utilizing a plurality of spur gears to provide a reduction ratio sufficient to allow the motor 27 to extend and retract the thumb assembly 28 at an appropriate speed and with sufficient force to withdraw and insert the data cartridge 16 into the selected cartridge receiving device. In one preferred embodiment, the gear reduction system 29 provides a reduction ratio of about 11.5:1, although other ratios may be used depending on, for example, the speed and torque characteristics of the particular motor 27 that is selected. The various spur gears comprising the gear reduction system 29 may be made from any convenient material, such as metal or plastic, suitable for the intended application. By way of example, in one preferred embodiment, the various spur gears comprising the gear reduction system 29 are made from brass and stainless steel. Alternatively, the gear reduction system could utilize other types of gears, such as worm gears, to provide the desired reduction.

The thumb assembly 28 may also be provided with any of a wide variety of finger assemblies well-known in the art for engaging data cartridges, such as data cartridge 16. Accordingly, the present invention should not be regarded as limited to any particular type of finger assembly. By way of example, in one preferred embodiment, the finger assembly 33 may comprise an arm 35 having a hook portion 37, as best seen in FIG. 6. Hook portion 37 of arm 35 is configured to engage the notch 39 (FIGS. 10a and 10b) provided on the data cartridge 16. The arm 35 is pivotally mounted to the main body 98 of the thumb assembly 28 so that the arm 35 is free to pivot about pivot axis 41. See FIG. 5. A spring (not shown) may be used to bias the arm 35 toward the engaged position shown in FIG. 10a. The arm 35 may be provided with a pin 43 (FIG. 5) which engages a guide track 45 provided on the second side 96 of frame assembly 82 (FIG. 6). The guide track 45 actuates the arm 35 as the thumb assembly 28 moves back and forth between the retracted position 50 shown in FIG. 10a and the extended position 75 shown in FIG. 10b. However, since finger and track systems, such as finger assembly 33 and guide track 45, for engaging cartridges are well-known in the art and could be easily provided by persons having ordinary skill in the art after having become familiar with the teachings of the present invention, the particular finger assembly 33 and guide track 45 used in one preferred embodiment of the present invention will not be described in greater detail herein.

The foregoing description of the data storage system 14 and related components (e.g., the cartridge picker assembly 12, thumb assembly 28, and picker positioning system 26) is provided in order to better understand one environment in which the shipping lock apparatus 10 according to the present invention may be used. However, as was mentioned above, it should be understood that the shipping lock apparatus 10 may be used in any of a wide range of other types of data storage systems or other similar devices having moveable internal components. Consequently, the present invention should not be regarded as limited to the particular data storage system 14 shown and described herein. Also, since detailed descriptions of the data storage system 14 and related components (e.g., the cartridge picker assembly 12, thumb assembly 28, and the picker positioning system 26) are not required to understand or practice the shipping lock apparatus invention, the particular data storage system 14 and related components that may be used in conjunction with the shipping lock apparatus 10 will not be described in further detail herein.

Figure 9:
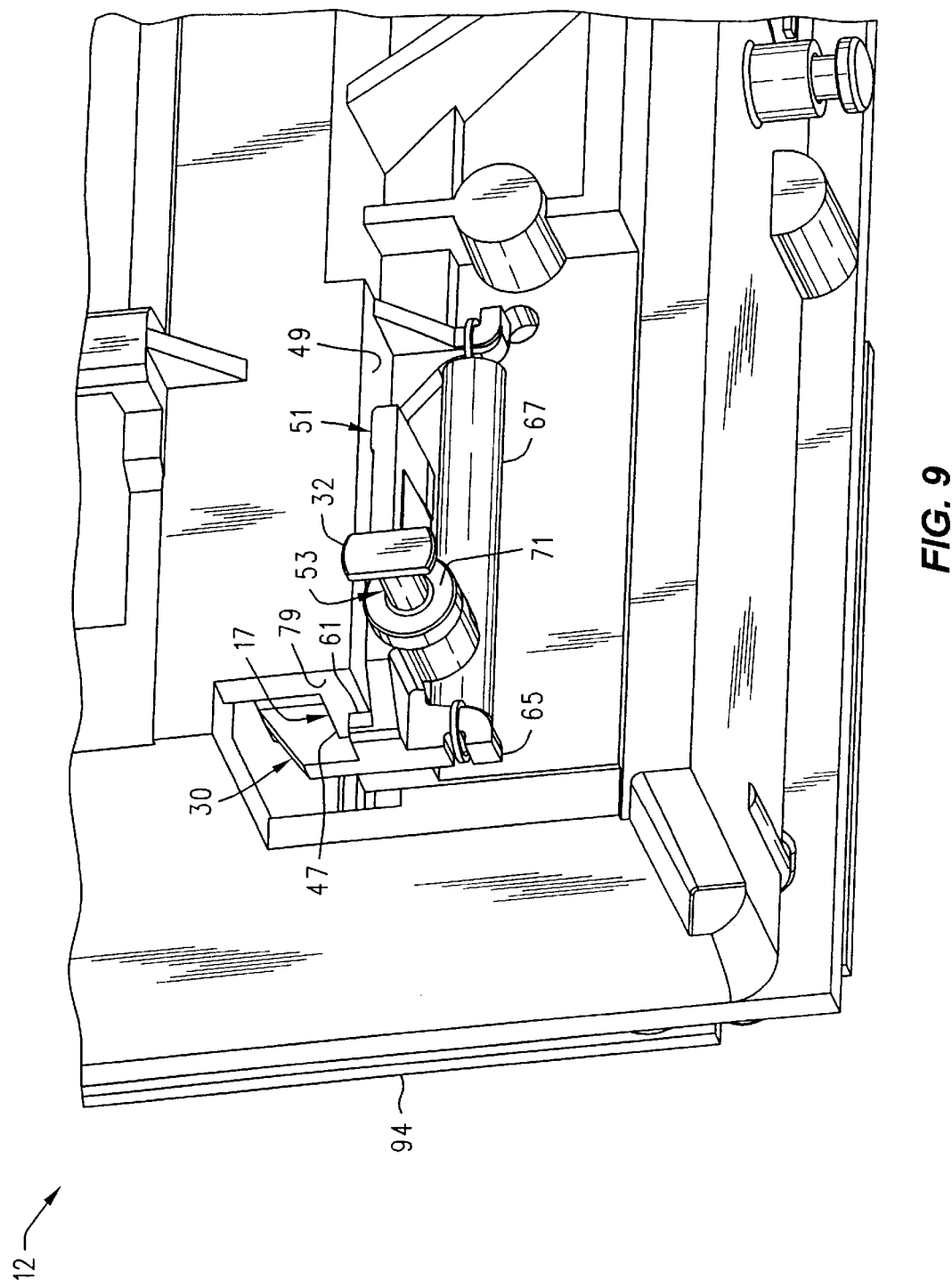
FIG. 9 is a greatly enlarged perspective view of the cartridge engaging assembly and lock member.

Referring now to primarily to FIGS. 3 and 7–9, the shipping lock apparatus 10 may comprise a lock member 30 that is attached to the cartridge picker 12 so that the lock member 30 may be moved between a locked position 32 and an unlocked position 34. See FIG. 3. In the embodiment shown and described herein, the lock member 30 is slidably mounted between the top and bottom sides 47 and 49 of the horizontal guide surface 17 of the first side 94 of the picker frame 82, as best seen in FIG. 9. This mounting arrangement allows the thumb assembly 28 to move the lock member 30 between the locked and unlocked positions 32 and 34, respectively. Alternatively, other mounting arrangements may be required or desired depending on the configuration of the particular picker frame assembly 82 that is to be used.

Figure 7:
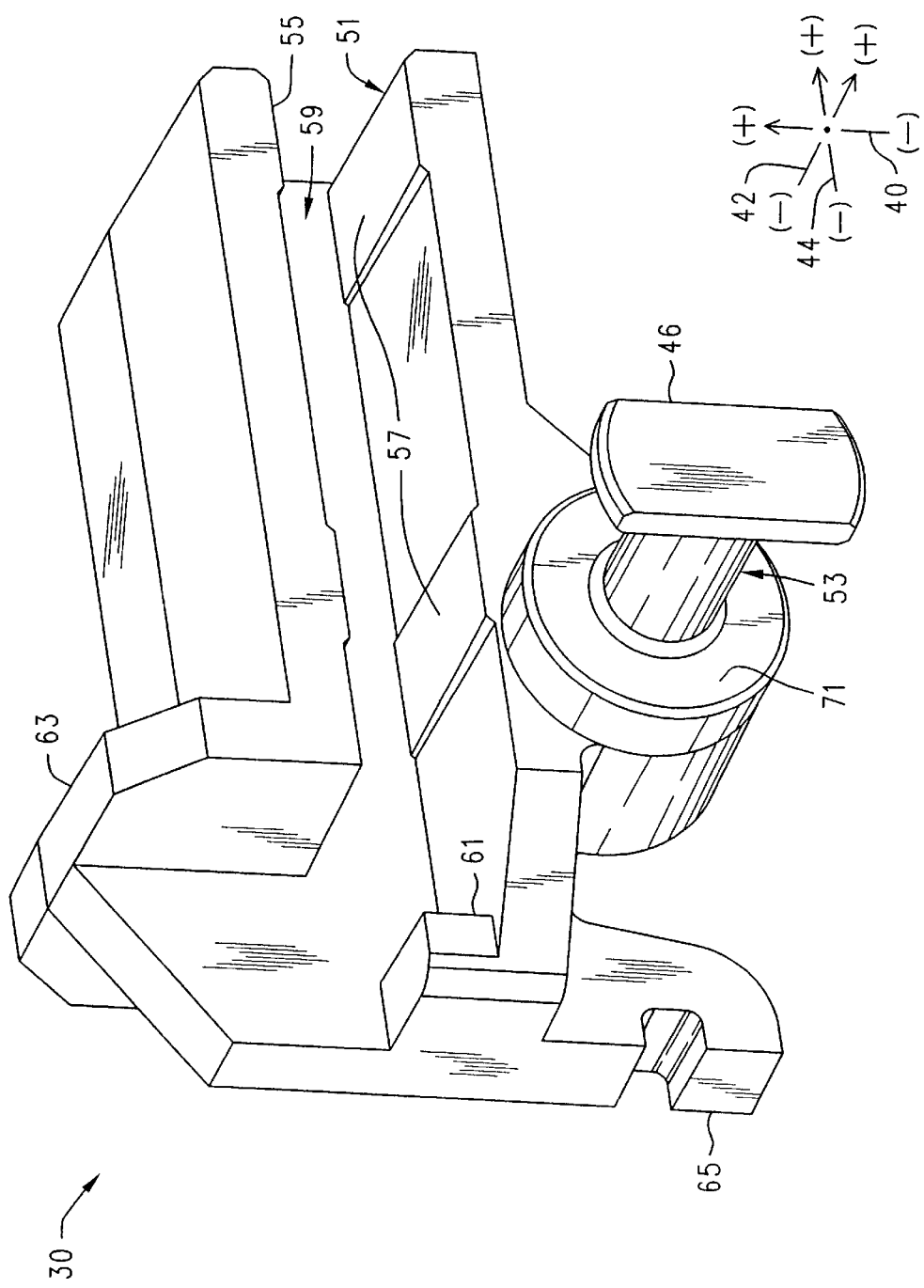
FIG. 7 is a greatly enlarged perspective view of the lock member.
Figure 8:
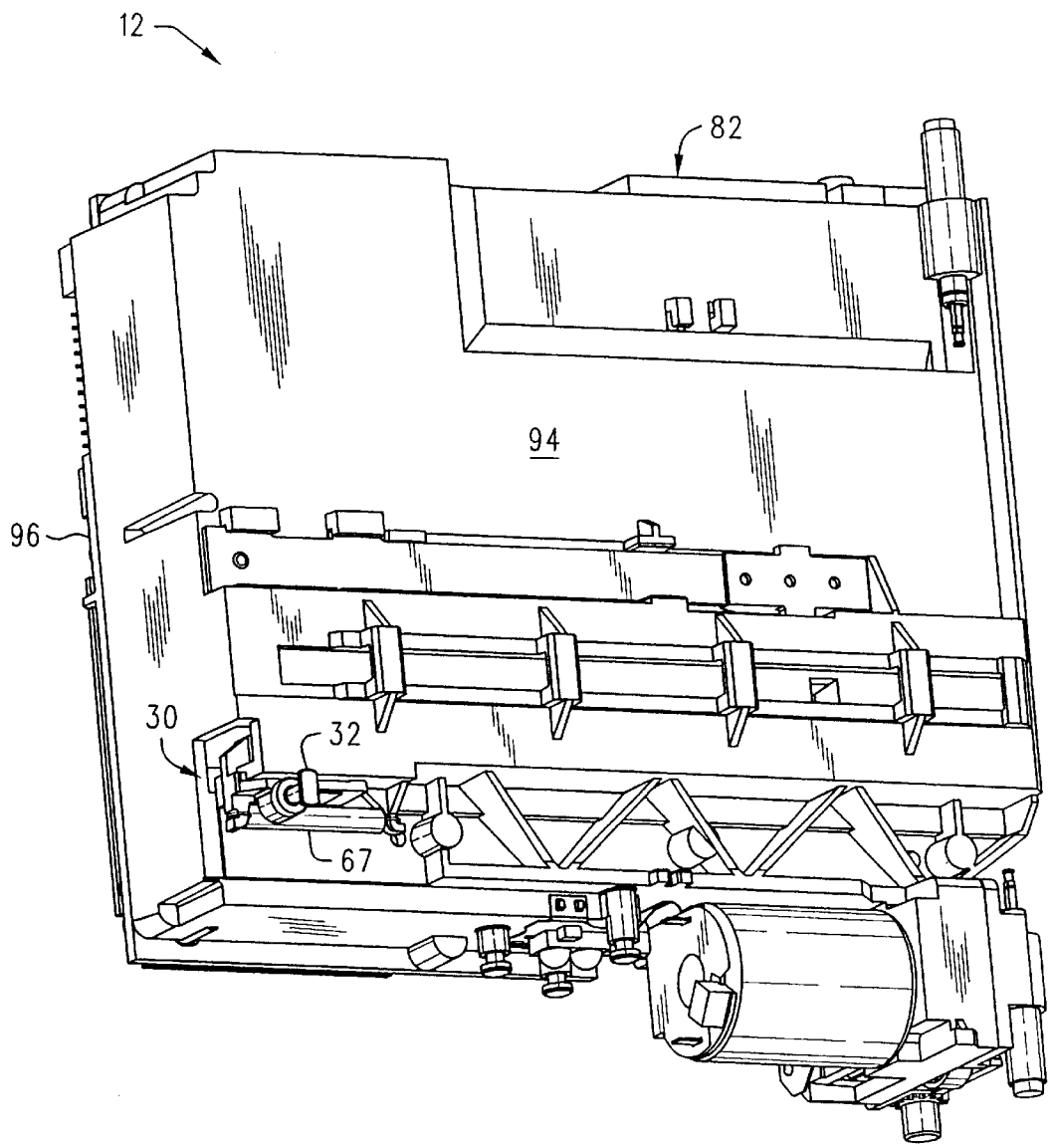
FIG. 8 is a perspective view of the cartridge engaging assembly and lock member.

Referring now primarily to FIG. 7, the lock member 30 utilized in the embodiment shown and described herein may comprise a slide portion 51 and a pin portion 53. The slide portion 51 of lock member 30 may be provided with an upper guide surface 55 and a lower guide surface 57 which together define a channel portion 59 that is sized to slidably engage the upper and lower surfaces 47 and 49 of the horizontal guide surface 17 of side member 94. The lower guide surface 57 of lock member 30 may be provided with an upturned travel stop section 61 which engages the end 79 of horizontal guide surface 17 to prevent the lock member 30 from moving in the positive (+) longitudinal direction 44 beyond the locked position 32. See FIGS. 3 and 9. The upper guide surface portion 55 of lock member 30 may be provided with an upturned thumb engaging portion 63. The upturned thumb engaging portion 63 is configured to engage (i.e., abut against) the main body portion 98 of thumb assembly 28 when the thumb assembly 28 nears the retracted position 50 (FIG. 10a). The arrangement is such that the thumb assembly 28 moves the lock member 30 from the locked position 32 to the unlocked position 34 (FIG. 3) as the thumb assembly 28 moves to the fully retracted position 50 illustrated in FIG. 10a. The slide portion 51 of lock assembly 30 may also be provided with an arm 65 sized to receive the return spring 67 (FIG. 9) which biases the lock member 30 toward the locked position 32. See FIGS. 3 and 9.

The pin portion 53 of lock member 30 extends outwardly from the slide section 51 generally in the positive (+) lateral direction 42 and is sized to engage the T-shaped slot 36 provided in the chassis 38. The pin 53 may be provided with an enlarged head section 46 to engage the side 69 of chassis 38 to prevent the cartridge picker 12 from moving in the negative (−) lateral direction 42 when the lock assembly 30 is in the locked position 32. See FIG. 3. The pin 53 also may be provided with a shoulder 71 for engaging the back side (not shown) of chassis 38 to prevent the picker assembly 12 from moving in the positive (+) lateral direction 42 when the lock member 30 is in the locked position 32.

The lock member 30 may be fabricated from any of a wide range of materials (e.g., metals or plastics) suitable for the intended application. Consequently, the present invention should not be regarded as limited to a lock member 30 comprising any particular material. By way of example, in one preferred embodiment, the lock member 30 is formed from Nylon 610 and the pin 53 comprises a separate component fabricated from stainless steel. Alternatively, the lock member 30 could comprise a single unitary piece, as would be obvious to persons having ordinary skill in the art after having become familiar with the teachings of the present invention.

The shipping lock apparatus 10 also may be provided with a T-shaped slot 36 located in the chassis or frame 38 of the data storage system 14, as is best seen in FIG. 3. The T-shaped slot 36 is sized to receive and engage the pin 53 of lock member 30. That is, when the lock member 30 is in the unlocked position 34, the enlarged head 46 of the lock member 30 is free to pass through the enlarged portion 48 of the T-shaped slot 36. Thereafter, if the lock member 30 is moved to the locked position 32, the lock member 30 will engage the leg portion 81 of the T-shaped slot 36. This engaged condition is illustrated in FIGS. 2 and 3. The engagement of the lock member 30 with the leg portion 81 of slot 36 in the frame or chassis 38 restrains the cartridge picker 12 in the vertical and lateral directions 40 and 42, respectively. The engagement of the lock member 30 and slot 36 also prevents the cartridge picker 12 from moving in the positive (+) longitudinal direction 44. It should be noted that the shipping lock apparatus 10 is not limited to a T-shaped slot 36 and slots having other shapes could also be used, as would be obvious to persons having ordinary skill in the art.

The shipping lock apparatus 10 may be operated as follows to secure the moveable cartridge picker 12 to the frame or chassis 38 of the data storage system 14. As a first step in the process, the thumb mechanism 28 mounted within the cartridge picker 12 is moved to the fully retracted position 50, as best seen in FIG. 10a. As the thumb assembly 28 nears the fully retracted position 50, the main body portion 98 of thumb assembly 28 contacts the upturned thumb engaging portion 63 of lock member 30. This contact causes the lock member 30 to move toward the unlocked position 34 as the thumb assembly 28 moves toward the retracted position 50. See FIGS. 3 and 10b. When the thumb assembly 28 reaches the fully retracted position 50 (FIG. 10a), the lock member 30 will be in the fully unlocked position 34 (FIG. 3). The picker positioning system 26 (FIG. 1) may then be operated as necessary to move the cartridge picker assembly 12 in the positive (+) lateral direction 42 to the stowed position 52 (illustrated in FIGS. 2 and 3). As the picker positioning system 26 moves the cartridge picker assembly 12 toward the stowed position 52, the enlarged head 46 of the lock members 30 passes through the enlarged portion 48 of the T-shaped slot 36. The picker positioning system 26 may continue to move the cartridge picker 12 toward the stowed position 52 (i.e., in the positive (+) lateral direction 42) until the cartridge picker 12 abuts against a hard stop (not shown) provided on the frame or chassis 38. When the cartridge picker assembly 12 is fully in the stowed position 52, the enlarged head 46 of lock member 30 will have passed completely through the enlarged portion 48 of the T-shaped slot 36. The thumb assembly 28 contained within the cartridge picker 12 may then be extended slightly (i.e., moved in the direction of arrow 86) to allow the spring 67 to return the lock member 30 to the locked position 32 and engage the T-shaped slot 36. The engagement of the lock member 30 with the T-shaped slot 36 secures the cartridge picker 12 to the frame or chassis 38, thereby preventing excessive movement of the cartridge picker 12 with respect to the chassis 38. The data storage system 14 may thereafter be moved or transported without the danger that the moveable cartridge picker 12 will be damaged or mis-aligned due to excessive movement of the cartridge picker assembly 12 within the chassis 38.

The shipping lock apparatus 10 may be disengaged or unlocked after the data storage system 14 has been moved to its new location by reversing the engagement process described above. That is, the shipping lock 10 may be disengaged by first fully retracting the thumb assembly 28 contained within the cartridge picker 12 to move the lock member 30 from the locked position 32 to the unlocked position 34. Thereafter, the picker positioning system 26 may be actuated to move the cartridge picker 12 in the negative (−) lateral direction 42 i.e., away from the stowed position 52. The data storage system 14 then may be placed in service and operated as desired.

It is contemplated that the inventive concepts herein described may be variously otherwise embodied and it is intended that the appended claims be construed to include alternative embodiments of the invention except insofar as limited by the prior art.

What is claimed is:

1. Shipping lock apparatus for securing a moveable carriage within a frame, comprising:

a lock member extending along a lateral direction, said lock member being mounted to the carriage so that said lock member can be moved along a longitudinal direction between a locked position and an unlocked position;

a lock actuator operatively associated with said lock member, said lock actuator moving said lock member between the locked position and the unlocked position; and a slot associated with the frame, said slot being sized to engage said lock member when said carriage is located at a stowed position and when said lock member is placed in the locked position, the engagement of said lock member with said slot restraining the carriage in at least the lateral direction.

2. The shipping lock apparatus of claim 1, further comprising a bias member operatively associated with said lock member for biasing the lock member in the locked position.

3. The shipping lock apparatus of claim 2, wherein said bias member comprises a spring.

4. Shipping lock apparatus for securing a moveable carriage within a frame, comprising:

a slot located on the frame;

lock means associated with the carriage for releasably engaging said slot when the carriage is located at a stowed position; and actuator means associated with said lock means for moving said lock means along a longitudinal direction between a locked position and an unlocked position, the engagement of said lock means with said slot restraining the carriage in at least a lateral direction, the lateral direction being substantially perpendicular to the longitudinal direction.

5. A method for securing a moveable carriage to a frame, comprising:

providing the moveable carriage with a lock member that extends along a lateral direction and that is moveable along a longitudinal direction between a locked position and an unlocked position;

providing the frame with a slot therein for engaging said lock member when said lock member is in the locked position;

moving the moveable carriage to a stowed position adjacent the frame; and moving said lock member to the locked position to engage said lock member with said slot, the engagement of said lock member with said slot restraining the carriage in at least the lateral direction.

6. The method of claim 5, further comprising moving said lock member to the unlocked position before moving the moveable carriage to a stowed position adjacent the frame.

* * * * *